US012512493B2

(12) United States Patent
Lee

(10) Patent No.: US 12,512,493 B2
(45) Date of Patent: Dec. 30, 2025

(54) SYSTEM AND METHOD FOR CONTROLLING OPERATION OF FUEL CELL SYSTEM

(71) Applicants: HYUNDAI MOTOR COMPANY, Seoul (KR); KIA CORPORATION, Seoul (KR)

(72) Inventor: Ji Yeon Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 439 days.

(21) Appl. No.: 17/738,733

(22) Filed: May 6, 2022

(65) Prior Publication Data
US 2023/0095116 A1    Mar. 30, 2023

(30) Foreign Application Priority Data
Sep. 30, 2021    (KR) .................. 10-2021-0129325

(51) Int. Cl.
*H01M 8/04537*    (2016.01)
*H01M 8/04089*    (2016.01)
*H01M 8/04746*    (2016.01)

(52) U.S. Cl.
CPC ... *H01M 8/04544* (2013.01); *H01M 8/04089* (2013.01); *H01M 8/04753* (2013.01)

(58) Field of Classification Search
CPC ...................................................... H01M 8/04
See application file for complete search history.

(56) References Cited

U.S. PATENT DOCUMENTS

| | | | | |
|---|---|---|---|---|
| 2011/0171549 A1* | 7/2011 | Kato | ................ | H01M 8/04225 |
| | | | | 429/429 |
| 2012/0021317 A1* | 1/2012 | Shigezumi | .......... | H01M 8/0494 |
| | | | | 429/432 |
| 2012/0141898 A1* | 6/2012 | Tanaka | .............. | H01M 8/04253 |
| | | | | 429/432 |
| 2014/0272651 A1* | 9/2014 | Kumei | .............. | H01M 8/04253 |
| | | | | 429/429 |

FOREIGN PATENT DOCUMENTS

| | | |
|---|---|---|
| JP | 5447684 B2 | 3/2014 |
| JP | 2021-005525 A | 1/2021 |
| JP | 6812851 B2 | 1/2021 |
| KR | 2011-0036448 A | 4/2011 |

(Continued)

*Primary Examiner* — Haroon S. Sheikh
(74) *Attorney, Agent, or Firm* — MCDONNELL BOEHNEN HULBERT & BERGHOFF LLP

(57) ABSTRACT

A system and method for controlling operation of a fuel cell system are described. The method includes diagnosing fuel cells by collecting voltage information of the fuel cells and selecting fuel cells vulnerable to reverse voltage based on the collected voltage information of the fuel cells, classifying the selected fuel cells vulnerable to reverse voltage depending on predetermined vulnerable operating conditions by confirming operating conditions of the selected fuel cells vulnerable to reverse voltage, and performing compensatory operation of the fuel cell system by executing fuel compensation control of the fuel cells vulnerable to reverse voltage depending on the classified vulnerable operation conditions.

7 Claims, 3 Drawing Sheets

(56) References Cited

FOREIGN PATENT DOCUMENTS

| | | | |
|---|---|---|---|
| KR | 2016-0116498 | A | 10/2016 |
| KR | 10-2128941 | B1 | 7/2020 |
| KR | 2020-0127780 | A | 11/2020 |
| KR | 2021-0062192 | A | 5/2021 |
| WO | 2012/053324 | A1 | 4/2012 |

\* cited by examiner

SYSTEM AND METHOD FOR CONTROLLING OPERATION OF FUEL CELL SYSTEM

CROSS REFERENCE TO RELATED APPLICATIONS

This application claims priority from Korean Patent Application No. 10-2021-0129325, filed on Sep. 30, 2021, in the Korean Intellectual Property Office, the disclosure of which is incorporated herein by reference in its entirety.

BACKGROUND

1. Field

The present disclosure relates to a system and method for controlling operation of a fuel cell system, and more particularly, to a system and method for controlling operation of a fuel cell system which may prevent irreversible degradation from occurring during operation of the fuel cell system so as to increase durability of a fuel cell stack.

2. Description of the Related Art

Fuel cells are electrochemical devices which use an electrochemical reaction between hydrogen and oxygen so as to generate electric energy or electric power. Particularly, in a polymer electrolyte fuel cell system widely applied to vehicles, water serves as a medium configured to transmit protons ($H^+$) to an electrolyte membrane between a cathode and an anode, and thus, maintenance of the water content of the electrolyte membrane at a designated level or greater is directly connected to the performance of fuel cells.

For example, in a dry-out condition in which there is not enough water, the water content of the electrolyte membrane is reduced, resistance of the electrodes is increased, and thus, the performance of the fuel cells is reduced, and, in a flooding condition in which there is too much water, water is condensed in a channel, to which air and hydrogen are supplied, reaction gases are not normally supplied to the electrodes, and thus, voltages of the fuel cells are rapidly reduced. When the fuel cell system is continuously operated in the above-described dry-out condition or flooding condition, degradation of the fuel cell system is accelerated.

As the usage period of the fuel cells is increased, irreversible degradation, such as physical deformation, proceeds inevitably, and operating characteristics, such as the above-described dry-out condition and flooding condition, may be changed due to such degradation.

Technology that controls operation of a fuel cell system so as to improve durability and efficiency of fuel cells by avoiding operating conditions, which may accelerate degradation of the fuel cells, is required.

The above information disclosed in the Background section is only for enhancement of understanding of the background of the disclosure and should not be interpreted as conventional technology that is already known to those skilled in the art.

SUMMARY

Therefore, the present disclosure has been made in view of the above problems, and it is an object of the present disclosure to provide a system and method for controlling operation of a fuel cell system which may select in advance fuel cells having a high possibility of occurrence of reverse voltage in the fuel cell system, and may prevent the selected fuel cells from being repeatedly exposed to vulnerable operating conditions so as to prevent irreversible degradation of the fuel cells.

It is another object of the present disclosure to provide a system and method for controlling operation of a fuel cell system which may suggest compensatory operating modes executed to improve recovery from reversible degradation and to reduce exposure of irreversible degradation so as to increase durability of a fuel cell stack through the compensatory operating modes.

It is yet another object of the present disclosure to provide a system and method for controlling operation of a fuel cell system which may select fuel cells in vulnerable operating conditions having a high possibility to exposure to irreversible degradation, may diagnose the selected fuel cells by classifying the selected fuel cells depending on the vulnerable operating conditions thereof, and may execute compensatory operating modes in stages depending on a result of diagnosis.

It is still another object of the present disclosure to provide a system and method for controlling operation of a fuel cell system which may implement optimized compensatory operation control and prevent unnecessary oversupply of fuel through execution of compensatory operating modes in stages, so as to improve fuel efficiency.

In accordance with an aspect of the present disclosure, the above and other objects can be accomplished by a method for controlling operation of a fuel cell system, the method including diagnosing fuel cells by collecting voltage information of the fuel cells and selecting fuel cells vulnerable to reverse voltage based on the collected voltage information of the fuel cells, classifying the selected fuel cells vulnerable to reverse voltage depending on predetermined vulnerable operating conditions by confirming operating conditions of the selected fuel cells vulnerable to reverse voltage, and performing compensatory operation of the fuel cell system by executing fuel compensation control of the fuel cells vulnerable to reverse voltage depending on the classified vulnerable operation conditions.

In the diagnosing the fuel cells, fuel cells having voltage deviations equal to or greater than a first reference voltage may be selected as the fuel cells vulnerable to reverse voltage.

The fuel compensation control may be any one of control configured to increase an amount of hydrogen supplied or control configured to increase a ratio of hydrogen in anodes in the fuel cells.

The vulnerable operating conditions may include two or more of operating conditions determined from factors in a group including temperatures of the fuel cells, current densities, change in the current densities, flow rates of hydrogen supplied, and mixing ratios of nitrogen in anodes of the fuel cells.

In the classifying the fuel cells vulnerable to reverse voltage depending on the predetermined vulnerable operating conditions, when the vulnerable operating condition of a fuel cell vulnerable to reverse voltage is classified as a first operating condition group determined depending on the mixing ratio of nitrogen in the anode of the corresponding fuel cell vulnerable to reverse voltage, in the performing the compensatory operation of the fuel cell system, the fuel compensation control configured to reduce the mixing ratio of nitrogen of the anode of the corresponding fuel cell vulnerable to reverse voltage to a reference mixing ratio or less may be executed.

In the classifying the fuel cells vulnerable to reverse voltage depending on the predetermined vulnerable operating conditions, when the vulnerable operation condition of another fuel cell vulnerable to reverse voltage is classified as a second operating condition group determined depending on the temperature, the current density, the change in the current density or the flow rate of hydrogen supplied of the corresponding fuel cell vulnerable to reverse voltage, in the performing the compensatory operation of the fuel cell system, the fuel compensation control configured to increase an amount of hydrogen supplied to the anode of the corresponding fuel cell vulnerable to reverse voltage may be executed.

In the performing the compensatory operation of the fuel cell system, when the fuel compensation control depending on the classified vulnerable operation conditions is executed and the selected voltage deviations of the fuel cells vulnerable to reverse voltage are equal to or greater than the first reference voltage until a predetermined time elapses, in case of the fuel cell vulnerable to reverse voltage, the vulnerable operating condition of which is classified as the first operating condition group, additional fuel compensation control configured to increase the amount of hydrogen supplied to the anode of the corresponding fuel cell vulnerable to reverse voltage may be executed, and, in case of the fuel cell vulnerable to reverse voltage, the vulnerable operating condition of which is classified as the second operating condition group, additional fuel compensation control configured to increase both the amount of hydrogen supplied to the anode and an amount of air supplied to a cathode of the corresponding fuel cell vulnerable to reverse voltage may be executed.

During execution of the fuel compensation control in the performing the compensatory operation of the fuel cell system, when the voltage deviations of the fuel cells vulnerable to reverse voltage are reduced to less than a second reference voltage, the fuel compensation control may be terminated, and information about cell numbers of the fuel cells vulnerable to reverse voltage and the vulnerable operating conditions corresponding to the fuel cells vulnerable to reverse voltage may be stored.

In accordance with another aspect of the present disclosure, there is provided a system for controlling operation of a fuel cell system configured to receive hydrogen and air through a hydrogen supply line and an air supply line, the system including a first valve installed on the hydrogen supply line so as to control an amount of hydrogen supplied, a second valve configured to purge a hydrogen recirculation line configured to recirculate gas discharged from anodes of fuel cells, and a controller configured to collect state information of the fuel cells including voltage information of the fuel cells, to select fuel cells vulnerable to reverse voltage based on the collected voltage information, and to execute fuel compensation control of the fuel cells vulnerable to reverse voltage depending on vulnerable operating condition classifications.

The controller may select fuel cells having voltage deviations equal to or greater than a first reference voltage as the fuel cells vulnerable to reverse voltage by confirming voltage deviations of the respective fuel cells.

The fuel compensation control executed by the controller may be any one of control configured to increase an amount of hydrogen supplied so as to increase an open degree of the first valve and control configured to increase a ratio of hydrogen in the anodes so as to purge the hydrogen recirculation line by opening the second valve.

The vulnerable operating conditions may include two or more of operating conditions determined from factors in a group including temperatures of the fuel cells, current densities, change in the current densities, flow rates of hydrogen supplied, and mixing ratios of nitrogen in anodes of the fuel cells, when the controller classifies the vulnerable operating condition of a fuel cell vulnerable to reverse voltage as a first operating condition group determined depending on the mixing ratio of nitrogen in the anode of the corresponding fuel cell vulnerable to reverse voltage, the controller may execute the fuel compensation control configured to open the second valve so as to reduce the mixing ratio of nitrogen of the anode of the corresponding fuel cell vulnerable to reverse voltage to a reference mixing ratio or less.

When the controller classifies the vulnerable operation condition of another fuel cell vulnerable to reverse voltage as a second operating condition group determined depending on the temperature, the current density, the change in the current density or the flow rate of hydrogen supplied of the corresponding fuel cell vulnerable to reverse voltage, the controller may execute the fuel compensation control configured to increase an open degree of the first valve so as to increase an amount of hydrogen supplied to the anode of the corresponding fuel cell vulnerable to reverse voltage.

The system may further include an air compressor installed on an air supply line so as to control an amount of air supplied, when the controller executes the fuel compensation control and the voltage deviations of the selected fuel cells vulnerable to reverse voltage are equal to or greater than the first reference voltage until a predetermined time elapses, in case of the fuel cell vulnerable to reverse voltage, the vulnerable operating condition of which is classified as the first operating condition group, the controller may execute additional fuel compensation control configured to open the first valve so as to increase the amount of hydrogen supplied to the anode of the corresponding fuel cell vulnerable to reverse voltage, and, in case of the fuel cell vulnerable to reverse voltage, the vulnerable operating condition of which is classified as the second operating condition group, the controller may execute additional fuel compensation control configured to operate the air compressor so as to additionally increase an amount of air supplied to a cathode of the corresponding fuel cell vulnerable to reverse voltage.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Figure 1:
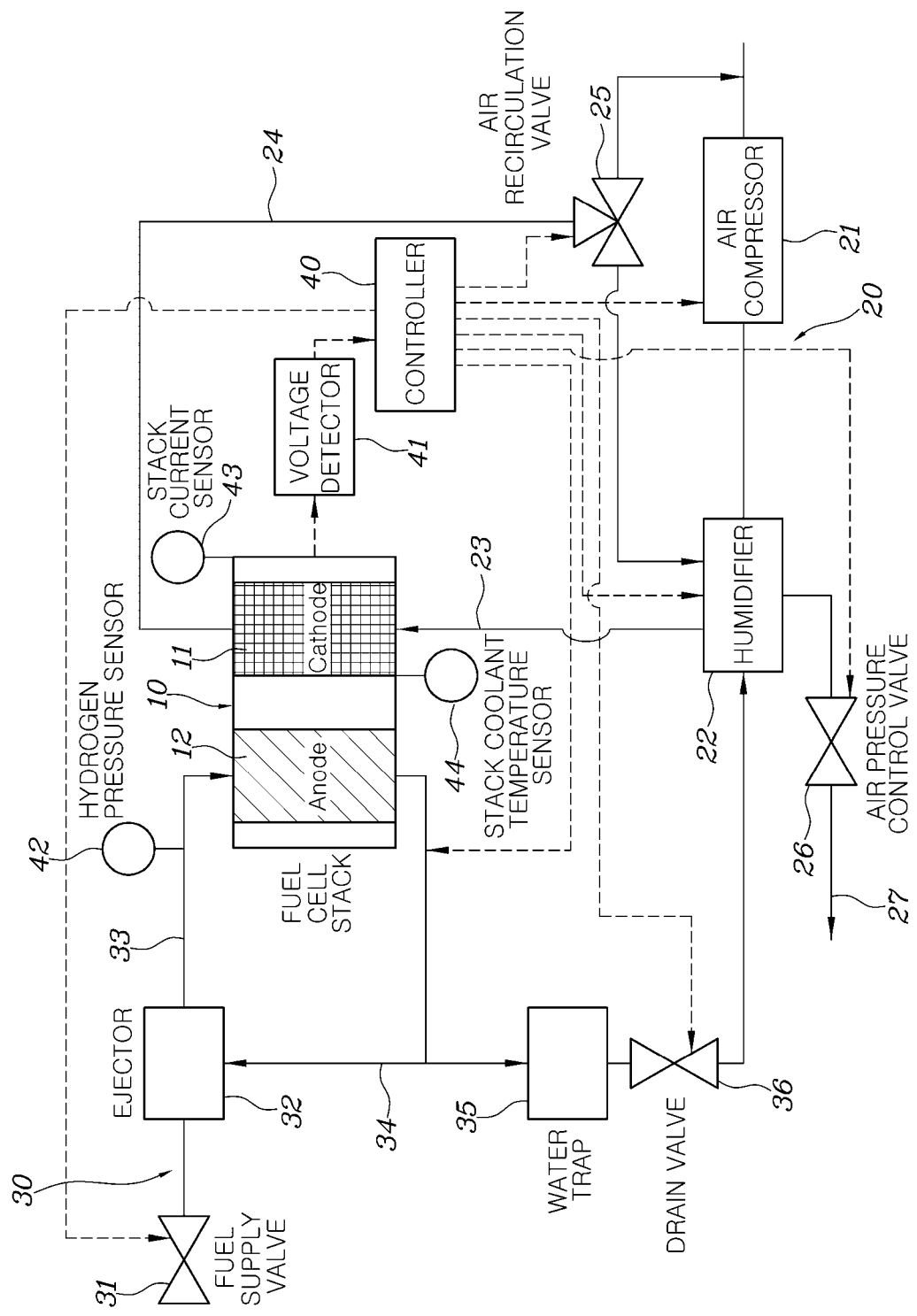
FIG. 1 is a circuit diagram schematically illustrating the configuration of a fuel cell system.

Reference will now be made in detail to the exemplary embodiments of the present disclosure, examples of which are illustrated in the accompanying drawings. Wherever possible, the same reference numbers will be used throughout the drawings to refer to the same or like parts.

Performance of a fuel cell stack may be reduced due to degradation during a process for operating the fuel cell stack.

Degradation of fuel cell stacks may be divided into reversible degradation from which the fuel cell stacks can recover performance thereof, and irreversible degradation from which the fuel cell stacks cannot recover performance thereof. A representative cause of irreversible degradation is reverse voltage. The reverse voltage of a fuel cell may be caused by various factors, such as flooding in the fuel cell, a low temperature condition, abnormality of a hydrogen supply device, etc.

In general, the reverse voltage of the fuel cell may be caused by lack of hydrogen at the anode side of the fuel cell, and such reverse voltage has a fatal adverse effect on performance of the fuel cell. Lack of hydrogen may frequently occur when hydrogen supplied to the anode of the fuel cell is nonuniformly supplied or distributed, when a load demand of the fuel cell is suddenly increased, such as during rapid acceleration, or in a low temperature and low flow rate operating condition, such as start-up of the fuel cell. As such, when lack of hydrogen at the anode occurs, an anode voltage is increased, and thereby, reverse voltage occurs temporarily or continuously. When the reverse voltage of the fuel cell occurs, reversible degradation is performed temporarily, and continuous occurrence of the reverse voltage of the fuel cell may cause irreversible degradation, i.e., permanent degradation.

In the present disclosure, as one of methods for increasing durability of fuel cells, a method for operating a fuel cell system while avoiding reverse voltage of fuel cells so as to prevent irreversible degradation and an operation control apparatus for implementing the same will be described.

Particularly, in the present disclosure, fuel cells vulnerable to reverse voltage may be selected in advance during operation of a fuel cell system, and the selected fuel cells may be sorted by classifying the vulnerable operating conditions of the fuel cells. Further, in the present disclosure, compensatory operation controls suitable for the classified vulnerable operating conditions may be set in advance, and the fuel cell system may be operated such that the respective compensatory operation controls suitable for the respective vulnerable operating conditions are performed in a compensatory operating mode.

The compensatory operation controls for preventing reverse voltage may include control configured to increase the stoichiometric ratio (hereinafter, referred to as 'SR') of the anode, control configured to reduce the recirculation rate of hydrogen at the anode (i.e., to increase purity of hydrogen), or control configured to increase both the SR of the anode and the SR of the cathode may be performed.

Further, the compensatory operating modes may be executed such that diagnosis and learning operations are performed, and may be configured to include termination logic executed to determine whether or not the fuel cell recovers from reversible degradation by monitoring the voltage of the fuel cell and to stop the compensatory operating modes upon determining that recovery from reversible degradation is completed so as to prevent oversupply of fuel and to improve fuel economy.

Through the above-described process, fuel cells having a high possibility of occurrence of reverse voltage are selected in advance and compensatory operation control is performed with respect to the selected fuel cells, thereby being capable of preventing repeated exposure of the fuel cells to vulnerable operating conditions, recovering from reversible degradation and preventing occurrence of irreversible degradation.

Hereinafter, a system and method for controlling a fuel cell system according to exemplary embodiments of the present disclosure will be described in detail with reference to the accompanying drawings.

FIG. 1 is a circuit diagram schematically illustrating the configuration of a fuel cell system.

Referring to FIG. 1, an air supply device 20 configured to supply air is connected to cathodes 11 of fuel cells of a fuel cell stack 10, and a hydrogen supply device 30 configured to supply hydrogen is connected to anodes 12 of the fuel cells of the fuel cell stack 10.

The air supply device 20 may include an air compressor 21 configured to draw in external air, to compress the air and then to supply the compressed air to a humidifier 22, and the humidifier 22 configured to humidify the compressed air so as to have an appropriate humidity.

The air compressor 21 is configured to variably control an RPM so as to variably control the amount of air supplied to the cathodes 11. Therefore, the SRs of the cathodes 11 may be directly increased or decreased by increasing or decreasing the RPM of the air compressor 21.

Air having passed through the humidifier 22 passes through the cathodes 11 via an air supply line 23, and reacts with hydrogen at the anodes 12. A membrane humidifier which exchanges moisture between moist gas discharged after the reaction of the fuel cells and air supplied from the outside may be mainly used as the humidifier 12. For this purpose, the air discharged from the outlets of the cathodes 11 may be resupplied to the humidifier 22 along a second air supply line 24. Here, an air recirculation valve 25 may be installed on the second air supply line 24. The air recirculation valve 25 may be a three-way valve, and the total flow rate of air may be increased by recirculating a part of air discharged from the outlets of the cathodes 11 to the upstream region of the humidifier 22 by controlling the open degree of the air recirculation valve 25. Further, an air pressure control valve 26 is installed at one side of the humidifier 22, and most air which does not participate in humidification is discharged to the outside along an air exhaust line 27 by way of the air pressure control valve 26. The air pressure control valve 36 may control the open degree of the air pressure control valve 26 simultaneously with or independently of control of the rotational speed of the air compressor 21, thereby being capable of controlling pressure applied by air supplied to the cathodes 11.

The hydrogen supply device 30 is configured such that hydrogen supplied through a hydrogen supply valve 31 is supplied to the anodes 12 through an ejector 32. A hydrogen pressure sensor 42 configured to detect pressure may be installed at the rear end of the ejector 32.

Among hydrogen supplied to the anodes 12, a part of hydrogen which does not participate in the reaction of the fuel cell stack 10 may be recirculated to the front ends of the anodes 12 through a hydrogen recirculation line 34, and may thus be supplied again to the anodes 12. During operation of the fuel cell stack 10, nitrogen in air supplied to the cathodes 11 of the fuel cell stack 10 and water (or vapor) generated at the cathodes 11 are transported to the anodes 12 through electrolyte membranes in the fuel cell stack 10 (i.e., crossover), and thus, impurities may be accumulated in the anodes 12. Such impurities in the anodes 12 may be discharged to the outside together with hydrogen which does not participate in the reaction and, for this purpose, a purge valve may be installed on the hydrogen recirculation line 34.

A water trap 35 configured to collect the condensed water may be installed at the outlets of the anodes 12 on the hydrogen recirculation line 34. Further, a drain valve 36 configured to discharge the condensed water collected in the water trap 35 may be installed. FIG. 1 illustrates the system in which the drain valve 36 may perform both a function of discharging the condensed water and a function of purging hydrogen without a separate purge valve. In this system, the condensed water in the water trap 35 may be discharged together with hydrogen which does not participate in the reaction.

A water level sensor (not shown) configured to sense a water level in the water trap 35 may be installed in the water trap 35, and the condensed water in the water trap 35 may be discharged to the outside through the drain valve 36 at the lower end of the water trap 35 upon confirming that the water level in the water trap 35 reaches a threshold by the water level sensor. In this case, the condensed water discharged through the drain valve 36 may be discharged to the outside along the air exhaust line 27, or may be transmitted to the humidifier 22 of the air supply device 20 so as to be used in humidification, as shown in FIG. 1.

Further, coolant channels configured to supply a coolant may be installed in the fuel cells, and a coolant supply device configured to control the temperature of the coolant passing through the coolant channels may be provided. Further, a coolant temperature sensor 44 configured to sense the temperature of the coolant may be installed in the coolant supply device, and particularly, may be installed so as to measure the temperature of the coolant at the outlet of the fuel cell stack 10.

Hydrogen supplied to the anodes 12 and air supplied to the cathodes 11 react with each other in the fuel cell stack 10 and thus generate power, and a current sensor 43 configured to measure stack current generated due to the reaction may be installed in the fuel cell stack 10. Further, a voltage detector 41 configured to detect information regarding the output voltage of the fuel cell stack 10 may be installed in the fuel cell system. Particularly, the voltage detector 41 may be configured to detect voltage deviations of the respective fuel cells in the fuel cell stack 10. Here, the voltage deviations of the respective fuel cells may indicate differences between the average voltage and the voltages of the respective fuel cells.

For example, the fuel cell system according to the present disclosure may include the fuel cell stack 10 formed by stacking a plurality of unit fuel cells, and may include a unit configured to measure the voltages of the respective fuel cells in the fuel cell stack 10. When the voltages of the respective fuel cells are measured by the voltage measurement unit, the average voltage of the fuel cells in the fuel cell stack 10 may be calculated using the respective measured voltages, and the voltage deviations of the respective fuel cells may be determined as differences between the calculated average voltage and the voltages of the corresponding fuel cells.

The voltage detector 41 in the present disclosure may indicate a unit configured to detect information regarding voltage so as to calculate the voltage deviations of the respective fuel cells or a unit configured to directly calculate the voltage deviations of the respective fuel cells. Therefore, the voltage detector 41 may be a device including sensors configured to detect the voltages of the respective fuel cells, or a device additionally including a calculation unit configured to calculate the voltages of the fuel cells and the voltage deviations of the fuel cells from other stack state information.

A controller 40 controls operation of the fuel cell system based on information acquired by various sensors 42, 43 and 44 and the voltage detector 41, and serves to generally control operable components in the fuel cell system, such as the air compressor 21, the various valves 25, 26, 31, and 36, etc.

Particularly, the controller 40 may be configured to select fuel cells having a high possibility of occurrence of reverse voltage based on results of detection of the voltage deviations of the respective fuel cells of the fuel cell stack 10, and to execute compensatory operation control in stages so as to prevent occurrence of irreversible degradation in the selected fuel cells. For example, the controller 40 may receive information regarding the voltage deviations of the respective fuel cells from the voltage detector 41, and may determine fuel cells having voltage deviations, which are equal to or greater than a reference value, as fuel cells having a high possibility of occurrence of reverse voltage. For this purpose, the controller 40 may include a reverse voltage risk determiner configured to determine a risk of reverse voltage of each of the fuel cells based on the voltage deviations of the respective fuel cells.

Further, the controller 40 may include a memory configured to store a list of operating conditions vulnerable to reverse voltage risk occurrence which are classified in advance, and may further include a condition classifier configured to categorize vulnerable operating conditions, which are issued currently, depending on classifications in the list of the vulnerable operating conditions stored in the memory.

Further, the controller 40 may include a compensatory operation controller configured to execute compensatory operation control so as to solve the risk of reverse voltage, and the compensatory operation control may be executed according to compensatory operation control logics set depending on the vulnerable operating conditions stored in the memory. Therefore, when the reverse voltage risk determiner determines that a fuel cell requires the compensatory operation control and the operating condition of the corresponding fuel cell is determined according to the predetermined classifications of the vulnerable operating conditions, the compensatory operation controller executes control for improving supply of hydrogen to the anode 12 referring to the compensatory operation control logic corresponding to the classified vulnerable operating condition.

In such compensatory operation control, as described above, (i) control configured to increase the stoichiometric ratio (hereinafter, referred to as 'SR') of the anode 12, (ii) control configured to reduce the recirculation rate of hydrogen at the anode 12 (i.e., to increase purity of hydrogen), or (iii) control configured to increase both the SR of the anode 12 and the SR of the cathode 11 may be performed, and these (i) to (iii) controls may be predetermined so as to match the vulnerable operating conditions which are classified in advance.

Therefore, the compensatory operation controller may be configured to control operation of the hydrogen supply valve 31 on the hydrogen supply line 33, the purge value (or the drain valve 36) on the hydrogen recirculation line 34, and the air compressor 21 on the air supply line 23, in order to execute the (i) to (iii) controls.

The controller 40 may be a fuel cell control unit (FCU), or may be a lower-level control unit thereof, i.e., a separate lower-level control unit configured to determine fuel cells vulnerable to reverse voltage based on state information regarding the fuel cells or surroundings thereof, detected by the various sensors, and to execute the compensatory operation control for preventing reverse voltage.

Further, a system for controlling operation of a fuel cell system according to an implementation example of the present disclosure may indicate the controller 40 itself shown in FIG. 1, or may be the entirety of the fuel cell system in which the controller 40 is provided, or a part of the fuel cell system.

For example, the system according to the implementation example of the present disclosure may be a system for controlling operation of a fuel cell system which receives hydrogen and air through a hydrogen supply line and an air supply line. In this example, the system may include a first valve (for example, a hydrogen supply valve) installed on the hydrogen supply line so as to control the amount of hydrogen supplied, a second valve (for example, a purge valve) configured to purge a hydrogen recirculation line configured to recirculate gas discharged from anodes of fuel cells, and a controller configured to control these valves. Further, the controller may be configured to collect the state information of the fuel cells including voltage information of the fuel cells, to select fuel cells vulnerable to reverse voltage based on the collected voltage information, and to execute fuel compensation control depending on vulnerable operating condition classifications. Particularly, the controller may select fuel cells having voltage deviations, which are equal to or greater than a first reference voltage $V_{ref1}$, as the fuel cells vulnerable to reverse voltage by confirming the voltage deviations of the respective fuel cells. The first reference voltage $V_{ref1}$ is a value set to prevent reverse voltage, and particularly, is a value set to allow the fuel cell to reversibly recover the original voltage thereof before reverse voltage occurs or when reverse voltage occurs within a very short time. The first reference voltage $V_{ref1}$ may be determined through tests and, according to the implementation example of the present disclosure, the first reference voltage $V_{ref1}$ may be a value within the range of 15 mV to 25 mV. For example, the first reference voltage $V_{ref1}$ may be 20 mV.

The fuel compensation control executed by the controller may be any one of control configured to increase the amount of hydrogen supplied so as to increase the open degree of the first valve and control configured to increase the ratio of hydrogen in the anode so as to purge the hydrogen recirculation line by opening the second valve, or may include control configured to increase the amount of air supplied to the inside the cathode.

Further, the vulnerable operating conditions may be classified into operating conditions determined by the temperatures, the current densities, changes in the current densities, the flow rates of hydrogen supplied, and the mixing ratios of nitrogen into the anodes of the fuel cells. The vulnerable operating conditions, which are classified in advance, may be conditions in which nonuniform fuel supply may occur.

For example, the vulnerable operating conditions may be the case in which the fuel cell stack is operated at a low temperature of a reference temperature or lower, and the case in which operation of the fuel cell stack is rapidly accelerated such that the current density of the fuel cell stack is rapidly changed from a low current density or lower to a medium current density or higher within a short time (within a reference time). When the fuel cell stack is operated at a low temperature, the reference time may be 50° C., 45° C., 40° C. or 35° C. Further, the low current density may be 0.24 A/cm³, 0.20 A/cm³, 0.16 A/cm³ or 0.12 A/cm³, and the medium current density may be 0.56 A/cm³, 0.52 A/cm³, 0.48 A/cm³ or 0.44 A/cm³. The reference time may be a value within the range of 1 sec to 5 secs.

Further, the vulnerable operating conditions may include a low flow rate condition or a recirculated nitrogen oversupply condition. The low flow rate condition may be set to the case in which the fuel cell stack maintains the above-described low current density or lower for a designated time or more. The recirculated nitrogen oversupply condition may refer to the state in which the mixing ratio of nitrogen into the anode is excessively increased, for example, the case in which the mixing ratio of nitrogen to the total SR of the anode is a threshold or more. The threshold of the mixing ratio of nitrogen (i.e., a reference mixing ratio, A %) may be 8%, 10%, 12% or 15%.

Further, in the present disclosure, whether or not the fuel cells vulnerable to reverse voltage are recovered may be determined. For this purpose, a second reference voltage $V_{ref2}$ for releasing the compensatory operating mode is set and, when the voltage deviation of a fuel cell vulnerable to reverse voltage is reduced to less than the second reference voltage $V_{ref2}$, the corresponding fuel cell vulnerable to reverse voltage is determined as being reversibly recovered and thus as being in the state in which the risk of occurrence of reverse voltage is released. Here, the second reference voltage $V_{ref2}$ may be a value of 12 mV or less and, particularly, may be a value determined within the range of 5 mV to 12 mV. For example, the second reference voltage $V_{ref2}$ may be 10 mV.

When the voltage deviation of a fuel cell vulnerable to reverse voltage is reduced to less than the second reference voltage $V_{ref2}$, the controller 40 may terminate fuel compensation control of the corresponding fuel cell. In this case, the controller 40 may store information regarding the cell number of the fuel cell vulnerable to reverse voltage and the vulnerable operating condition corresponding to the fuel cell vulnerable to reverse voltage in the memory. The information may be stored for a predetermined period (for example, three months) and, in the case in which the compensatory operation control of a specific fuel cell is repeatedly executed for the same reason (due to the same vulnerable operating condition) within the corresponding period, the compensatory operating mode may be consistently executed under the corresponding vulnerable operating condition regardless of the voltage deviation of the corresponding fuel cell, and corresponding data may be stored. This case is a situation in which irreversible degradation of the fuel cell stack due to occurrence of reverse voltage is worrying, and thus, an alarm indicating the need to check the fuel cell system may be output.

When the voltage deviation of a selected fuel cell vulnerable to reverse voltage is still equal to or greater than the first reference voltage $V_{ref1}$, i.e., when the corresponding fuel cell still has a risk of reverse voltage, additional compensatory control may be executed to solve the risk of reverse voltage. As such additional compensatory control, different additional compensatory controls depending on the vulnerable operating conditions may be executed, for example, the SR of the anode may be increased after the mixing ratio of nitrogen is reduced to a demanded mixing ratio (B %), or both the SR of the cathode and the SR of the anode may be increased after the SR of the anode is increased.

Figure 2:
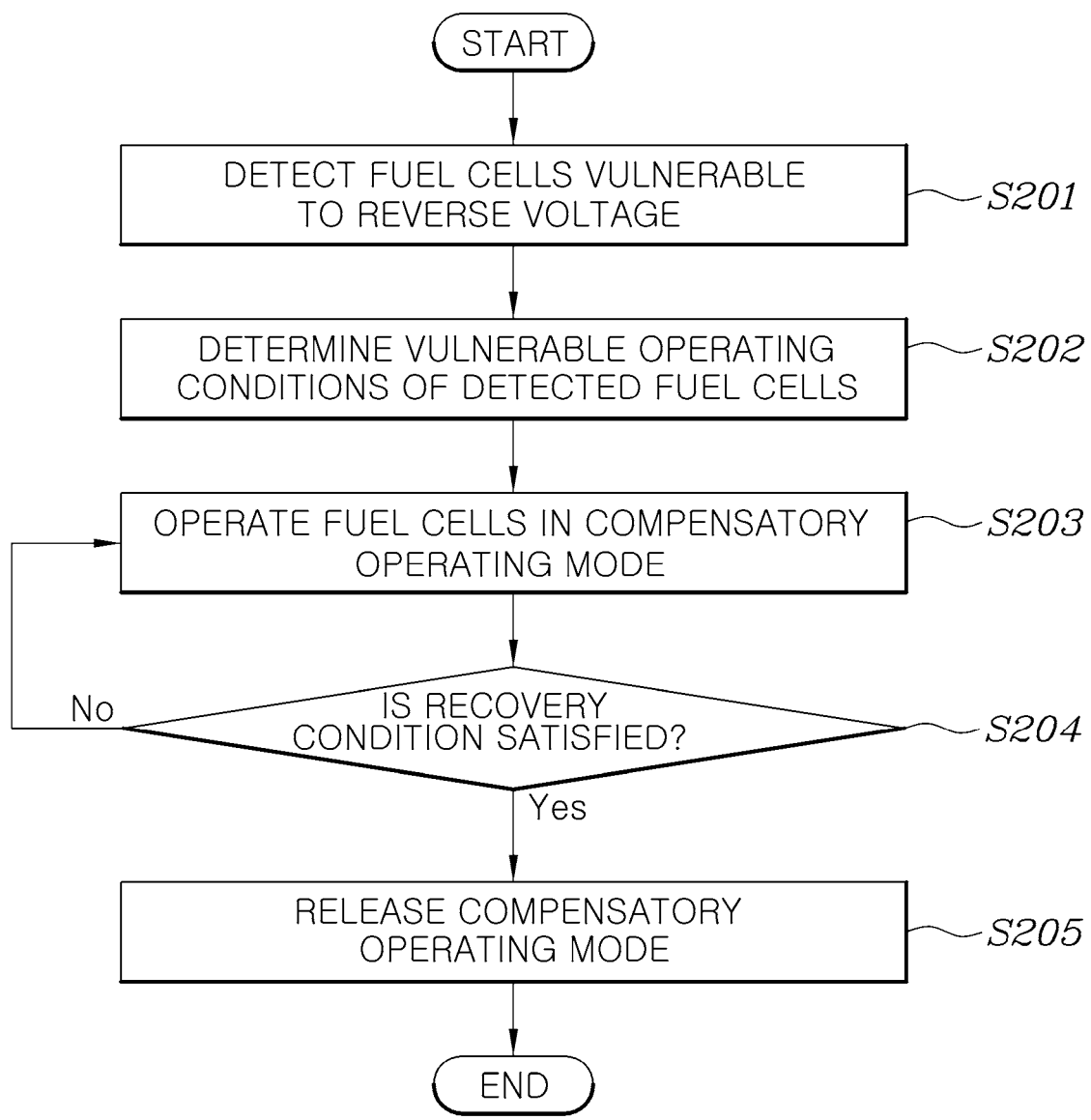
FIG. 2 is a flowchart schematically representing respective operations in a method for controlling operation of a fuel cell system according to an implementation example of the present disclosure.
Figure 3:
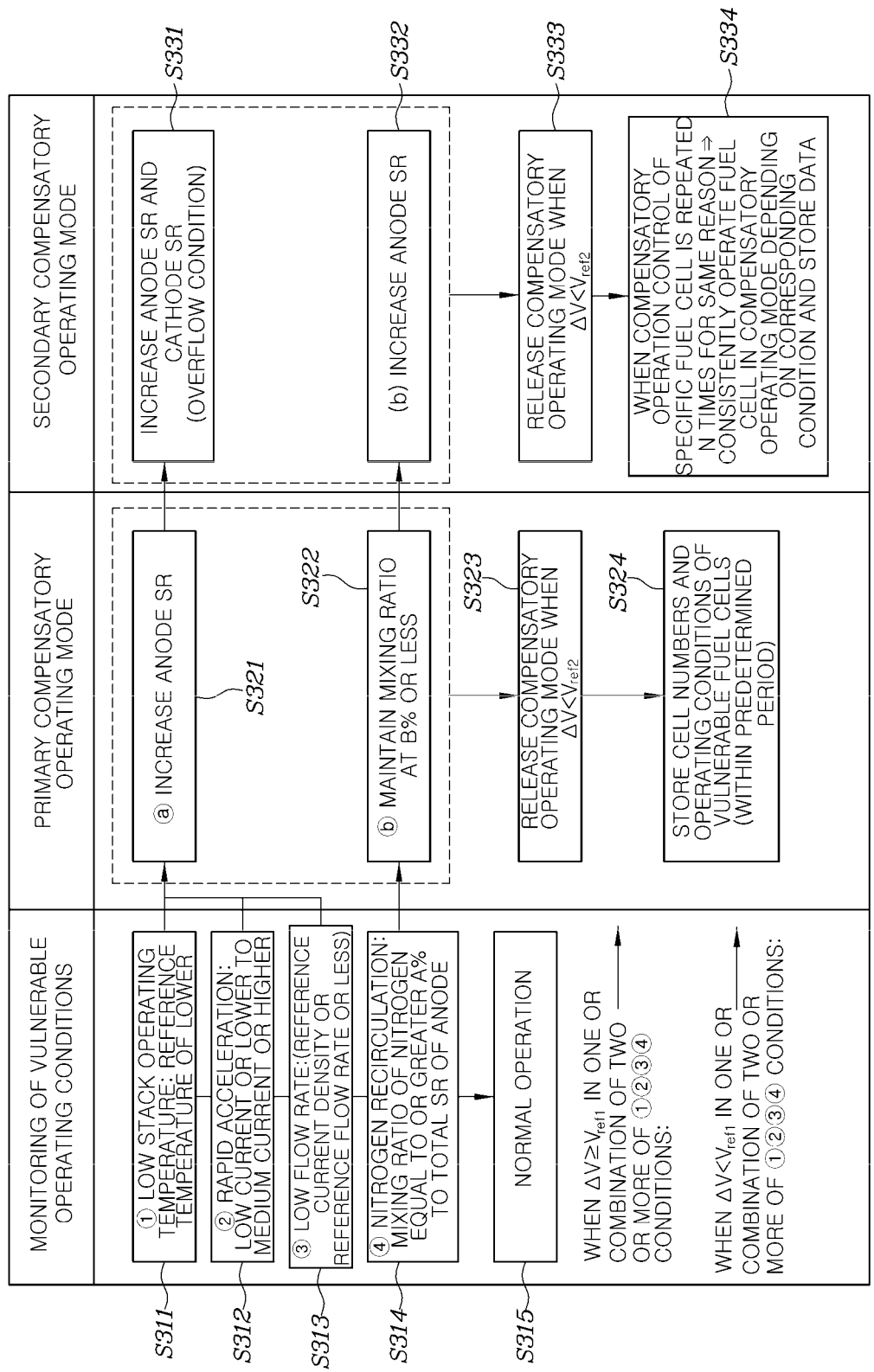
FIG. 3 is a flowchart representing an example of execution of compensatory operating modes in two stages after monitoring vulnerable operating conditions according to one embodiment of the present disclosure.

FIG. 2 is a flowchart schematically representing operations in a method for controlling operation of a fuel cell system according to an implementation example of the present disclosure, and FIG. 3 is a flowchart representing an example of execution of compensatory operating modes in two stages after monitoring vulnerable operating conditions according to one embodiment of the present disclosure.

Hereinafter, a method for controlling operation of a fuel cell system according to an implementation example of the present disclosure will be described in detail with reference to FIGS. 2 and 3.

FIG. 2 schematically represents the respective operations in the method according to the present disclosure.

As shown in FIG. 2, the method according to the present disclosure includes detecting fuel cells vulnerable to reverse voltage at S201, determining the vulnerable operating conditions of the detected fuel cells vulnerable to reverse voltage at S202, and operating the fuel cells vulnerable to reverse voltage in the compensatory operating mode depending on the vulnerable operating conditions at S203.

In the detection of the fuel cells vulnerable to reverse voltage at S201, the fuel cells may be diagnosed by collecting voltage information of the fuel cells and selecting fuel cells vulnerable to reverse voltage based on the collected voltage information. In the determination of the vulnerable operating conditions at S202, the selected fuel cells vulnerable to reverse voltage may be classified depending on the predetermined vulnerable operating conditions by confirming the operating conditions of the selected fuel cells vulnerable to reverse voltage. Further, in the operation of the fuel cells vulnerable to reverse voltage in the compensatory operating mode at S203, compensatory operation of the fuel cell system may be performed by executing fuel compensation control depending on the classified vulnerable operating conditions.

When the fuel cells vulnerable to reverse voltage are operated in the compensatory operating mode at S203, a condition to release the compensatory operating mode may be determined by whether or not the respective fuel cells vulnerable to reverse voltage satisfy a recovery condition (for example, whether or not the voltage deviations of the corresponding fuel cells are reduced to a reference recovery voltage value or less at S204). When the fuel cell vulnerable to reverse voltage does not satisfy the recovery condition, the corresponding fuel cell vulnerable to reverse voltage may maintain the compensatory operating mode and, when the fuel cell vulnerable to reverse voltage satisfies the recovery condition, the corresponding fuel cell vulnerable to reverse voltage may release the compensatory operating mode at S205, and may be restored to the normal operating mode. When the compensatory operating mode is maintained, an additional compensatory operating mode may be executed sequentially after the former compensatory operating mode, as shown in FIG. 3.

FIG. 3 shows the vulnerable operating conditions in detail in the method according to the present disclosure, and specific fuel compensation controls configured to solve nonuniform fuel supply depending on the vulnerable operating conditions may be prepared. In the example of FIG. 3, whether or not nonuniform fuel supply occurs may be confirmed by monitoring the vulnerable operating conditions of the fuel cells vulnerable to reverse voltage when the fuel cells vulnerable to reverse voltage are detected. Further, as results of monitoring of the vulnerable operating conditions, compensatory operation control determined depending on the condition categories, which were classified in advance, may be executed, and such compensatory operation control may be executed in stages so as to achieve optimum control.

Referring to FIG. 3, the left columns indicate a series of processes for monitoring the fuel cells vulnerable to reverse voltage and the vulnerable operating conditions thereof (S311 to S315). Further, the middle columns indicate a primary compensatory operating mode (S321 to S324), and the right columns indicate a secondary compensatory operating mode (S331 to S334).

As set forth in the left columns (S311 to S315), an example in which four vulnerable operating conditions are set is illustrated in the method according to the present disclosure. The example in which the four vulnerable operating conditions are set, as shown in FIG. 3, is just one example, and the method according to the present disclosure may be implemented as an embodiment in which at least two of the vulnerable operating conditions shown in FIG. 3 are set, or an embodiment in which other vulnerable operating conditions not shown in FIG. 3 are additionally set.

However, the vulnerable operating conditions may be divided into vulnerable operating conditions regarding the mixing ratio of nitrogen into the anode (i.e., vulnerable operating conditions regarding impurities at the anode), and vulnerable operating conditions regarding the amount of hydrogen supplied to the anode. The vulnerable operating conditions regarding the mixing ratio of nitrogen into the anode may be classified into a first operating condition group and, in this case, control configured to reduce the mixing ratio of nitrogen into the anode may be executed as compensatory operation control. Control configured to purge the recirculation line, for example, control configured to open the purge valve (or the drain valve 36) may be applied as compensatory operation control of such a first operating condition group. In this case, the mixing ratio of nitrogen into the anode may be controlled to be maintained at a designated level or less (for example, maintained at the demanded mixing ratio B % or less), and particularly, may be controlled to be maintained at the demanded mixing ratio B %, which is in the range of 5% or less, or less.

On the other hand, the vulnerable operating conditions regarding the amount of hydrogen supplied to the anode may be classified into a second operating condition group and, in this case, control configured to increase the SR of the anode so as to solve a problem in the supply of hydrogen to the anode, for example, control configured to increase the open degree of the hydrogen supply valve 31 may be executed as compensatory operation control. In this case, the SR of the anode may be increased by a value selected from the range of 5% to 15%.

In the example of FIG. 3, the vulnerable operating conditions may indicate ① the low stack operating temperature condition (i.e., the condition in which the fuel cells are operated at a reference temperature or lower), ② a rapid acceleration condition (i.e., the condition in which the fuel cells are rapidly accelerated from a low current density to a medium current density), ③ the low flow rate condition (i.e., the condition in which the fuel cells are maintained at a reference current density or less or at a reference flow rate or less for a designated time), and ④ the recirculated nitrogen oversupply condition in which an excessively large amount of hydrogen is recirculated, and the detailed examples of the respective cases have been described above.

Each of these vulnerable operating conditions may occur alone or a combination of two or more of these vulnerable operating conditions may occur, and in this case, each vulnerable operating condition may be categorized and then be stored in the controller.

The controller may confirm the vulnerable operating conditions in real time from information received from various sensors, and particularly, the controller may be configured to determine an operating mode depending on whether or not fuel cells vulnerable to reverse voltage having the current voltage deviations, which are equal to or greater than a first reference voltage $V_{ref1}$, are selected.

For example, when the voltage deviations of all of the fuel cells are less than the first reference voltage $V_{ref1}$, all of the fuel cells of the fuel cell stack maintain the normal operating mode at S315, regardless of ① the low temperature condition at S311, ② the rapid acceleration condition at S312, ③ the low flow rate condition at S313 and ④ the recirculated nitrogen oversupply condition at S314.

On the other hand, when the voltage deviation of a specific fuel cell is equal to or greater than the first reference voltage $V_{ref1}$, the corresponding fuel cell may be selected as a fuel cell vulnerable to reverse voltage, and in this case, the corresponding fuel cell may be operated in the compensatory operating mode depending on the currently monitored vulnerable operating condition of the corresponding fuel cell.

As shown in FIG. 3, when the vulnerable operating condition of the corresponding fuel cell is classified as one of ① the low temperature condition at S311, ② the rapid acceleration condition at S312 and ③ the low flow rate condition at S313, i.e., belongs to the second operating condition group, in a primary compensatory operating mode, compensatory operation control configured to increase the SR of the anode may be executed at S321. On the other hand, when the vulnerable operating condition of the corresponding fuel cell is classified as ④ the recirculated nitrogen oversupply condition at S314, i.e., belongs to the first operating condition group, in the primary compensatory operating mode, compensatory operation control configured to increase the mixing ratio of nitrogen into the anode may be executed at S322.

When the current operating condition of the corresponding fuel cell corresponds to a combination of various vulnerable operating conditions, in the primary compensatory operating mode, the compensatory operation controls designated depending on whether or not the vulnerable operating conditions belong to the first operating condition group and the second operating condition group may be executed together. For example, when the corresponding fuel cell satisfies all of ① the low temperature condition at S311, ② the rapid acceleration condition at S312 and ④ the recirculated nitrogen oversupply condition at S314, in the primary compensatory operating mode, compensatory operation control configured to increase the SR of the anode and the primary compensatory operating mode configured to increase the mixing ratio of nitrogen into the anode may be executed together. Further, when plural vulnerable operating conditions belonging to the second operating condition group are combined, in the primary compensatory operating mode, compensatory operation control configured to increase the SR of the anode may be executed, in the same manner as the case in which a single vulnerable operating condition belonging to the second operating condition group is used, but, in this case, a weight may be applied to the increase in the SR of the anode depending on the number of the combined vulnerable operating conditions belonging to the second operating condition group. In this case, compared to a single vulnerable operating condition, i.e., any one of ① the low temperature condition at S311, ② the rapid acceleration condition at S312 and ③ the low flow rate condition at S313, when two or more of ① the low temperature condition at S311, ② the rapid acceleration condition at S312 and ③ the low flow rate condition at S313 are combined, the increase rate of the SR of the anode may be set to a greater value. Further, an increased weight may be applied depending on the number of the combined vulnerable operating conditions, and the increase rate of the SR of the anode may be varied depending on the respective vulnerable operating conditions. In such an example, in which different weights depending on the vulnerable operating conditions are applied, unnecessary supply of fuel to the anode may be reduced, and thereby, optimum fuel supply control may be implemented.

The primary compensatory operating mode may be executed for a predetermined time and, when the voltage deviation of the corresponding fuel cell satisfies a fuel compensation control release condition (for example, the voltage deviation of the corresponding fuel cell is reduced to less than a second reference voltage $V_{ref2}$) within the predetermined time, the primary compensatory operating mode may be released at S323, and information regarding the cell number of the corresponding fuel cell vulnerable to reverse voltage and the vulnerable operating condition corresponding to the corresponding fuel cell may be stored in the memory at S324.

Although the primary compensatory operating mode is executed, when the voltage deviation of the selected fuel cell vulnerable to reverse voltage is still equal to or greater than the first reference voltage $V_{ref1}$, (i.e., when the corresponding fuel cell is still determined as a fuel cell vulnerable to reverse voltage) until the predetermined time elapses, the corresponding fuel cell may enter a secondary compensatory operating mode. In the secondary compensatory operating mode, as shown in FIG. 3, when the vulnerable operating condition of the corresponding fuel cell belongs to the first operating condition group, additional fuel compensation control configured to increase the amount of hydrogen supplied to the anode may be executed, and when the vulnerable operating condition of the corresponding fuel cell belongs to the second operating condition group, additional fuel compensation control configured to increase both the amount of hydrogen supplied to the anode and the amount of air supplied to the cathode may be executed. Further, when the voltage deviation of the corresponding fuel cell is reduced to less than the first reference voltage $V_{ref1}$ but is maintained at the second reference voltage $V_{ref2}$ or greater, i.e., when the voltage deviation of the corresponding fuel cell is within the range of the second reference voltage $V_{ref2}$ or greater to less than the first reference voltage $V_{ref1}$, such additional fuel compensation control may be executed.

The second compensatory operating mode is necessary in the case in which the vulnerable operating condition of the corresponding fuel cell belongs to the first operating condition group, i.e., the mixture ratio of nitrogen is excessive, when the voltage deviation of the corresponding fuel cell is not sufficiently reduced although the mixing ratio of nitrogen is reduced through purging of the hydrogen recirculation line. In this case, fuel is oversupplied to the anode by increasing the SR of the anode, and thereby, occurrence of reverse voltage may be prevented at S332.

In the case in which the vulnerable operating condition of the corresponding fuel cell belongs to the second condition group, when the voltage deviation of the corresponding fuel cell is not sufficiently reduced although the SR of the anode is increased, both the SR of the cathode and the SR of the anode may be increased so as to implement an overflow condition at S331. Here, the anode may be controlled to maintain the SR increased at S321, or may be controlled to have an additional SR increase compared to the SR increased at S321.

The secondary compensatory operating mode may be executed for a predetermined time and, when the voltage deviation of the corresponding fuel cell satisfies the fuel compensation control release condition (for example, the voltage deviation of the corresponding fuel cell is reduced to less than the second reference voltage $V_{ref2}$) within the predetermined time, the secondary compensatory operating mode may be released at S333. In the same manner as the primary compensatory operating mode, information regarding the cell number of the corresponding fuel cell vulnerable to reverse voltage and the vulnerable operating condition corresponding to the corresponding fuel cell may be stored in the memory.

In the case in which the compensatory operation control of a specific fuel cell is repeatedly executed for the same reason (i.e., due to the same vulnerable operating condition) within a predetermined period, settings in the controller may be changed so that the compensatory operating mode is consistently executed under the corresponding vulnerable operating condition regardless of the voltage deviation of the corresponding fuel cell at S334, and information regarding such settings change record may be stored in the controller, and particularly, may be transmitted to a management server.

When the voltage deviation of the corresponding fuel cell vulnerable to reverse voltage is not sufficiently reduced even through the secondary compensatory operating mode, i.e., when the corresponding fuel cell does not reach the recovery condition, the secondary compensatory operating mode may be terminated, the corresponding fuel cell may be restored to the normal operating mode, and then corresponding record may be stored. Alternatively, the corresponding record may be stored under the condition that the secondary compensatory operating mode is maintained. In this case, the corresponding fuel cell may be suspected as having irreversible degradation, and thus, related information may be provided to a user so as to manage durability of the fuel cell stack.

Thereby, the management server may manage the fuel cells vulnerable to reverse voltage, and may provide information regarding the fuel cells vulnerable to reverse voltage to the user.

As is apparent from the above description, a system and method for controlling operation of a fuel cell system according to one embodiment of the present disclosure may preemptively cope with entry to reverse voltage, which repeatedly occurs, thereby being capable of preventing permanent damage to a fuel cell stack and improving durability of the fuel cell stack.

Further, the system and method according to one embodiment of the present disclosure may provide optimum operation control technology so as to prevent degradation of the fuel cell system, thereby being capable of preventing carbon corrosion, alleviating voltage deviations among fuel cells, and preventing side reactions.

In addition, the system and method according to one embodiment of the present disclosure may provide compensatory operating modes executed in two stages depending on results of diagnosis and learning, thereby being capable of preventing oversupply of fuel after recovering from reversible degradation and thus improving fuel efficiency.

Moreover, the system and method according to one embodiment of the present disclosure may increase the lifespan of a catalyst configured to prevent reverse voltage in the anode of the fuel cell.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A method for controlling operation of a fuel cell system, the method comprising:
    diagnosing, by a controller, fuel cells by collecting voltage information of the fuel cells and selecting fuel cells vulnerable to reverse voltage based on the collected voltage information of the fuel cells;
    classifying the selected fuel cells vulnerable to reverse voltage depending on predetermined vulnerable operating conditions by confirming operating conditions of the selected fuel cells vulnerable to reverse voltage; and
    performing compensatory operation of the fuel cell system by executing fuel compensation control of the fuel cells vulnerable to reverse voltage differently depending on the classified vulnerable operation conditions;
    wherein the vulnerable operating conditions are determined based on one or more of temperatures of the fuel cells, current densities, change in the current densities, flow rates of hydrogen supplied, and mixing ratios of nitrogen in anodes of the fuel cells;
    wherein the vulnerable operating condition includes:
        a first operating condition group determined depending on the mixing ratio of nitrogen in the anode of the corresponding fuel cell vulnerable to reverse voltage; and
        a second operating condition group determined depending on one or more of the temperature, the current density, the change in the current density, or the flow rate of hydrogen supplied of the corresponding fuel cell vulnerable to reverse voltage.

2. The method according to claim 1, wherein, in the diagnosing the fuel cells, fuel cells having voltage deviations equal to or greater than a first reference voltage are selected as the fuel cells vulnerable to reverse voltage.

3. The method according to claim 1, wherein the fuel compensation control is any one of control configured to increase an amount of hydrogen supplied or control configured to increase a ratio of hydrogen in anodes in the fuel cells.

4. The method according to claim 1, wherein, in the classifying the fuel cells vulnerable to reverse voltage depending on the predetermined vulnerable operating conditions, when the vulnerable operating condition of a fuel cell vulnerable to reverse voltage is classified as the first operating condition group, in the performing the compensatory operation of the fuel cell system, the fuel compensation control is configured to reduce the mixing ratio of nitrogen of the anode of the corresponding fuel cell vulnerable to reverse voltage to a reference mixing ratio or less is executed.

5. The method according to claim 4, wherein, in the classifying the fuel cells vulnerable to reverse voltage depending on the predetermined vulnerable operating conditions, when the vulnerable operation condition of another fuel cell vulnerable to reverse voltage is classified as the second operating condition group, in the performing the compensatory operation of the fuel cell system, the fuel compensation control is configured to increase an amount of hydrogen supplied to the anode of the corresponding fuel cell vulnerable to reverse voltage is executed.

6. The method according to claim 5, wherein:
    in the performing the compensatory operation of the fuel cell system, when the fuel compensation control depending on the classified vulnerable operation conditions is executed and the selected voltage deviations of the fuel cells vulnerable to reverse voltage are equal to or greater than the first reference voltage until a predetermined time elapses, in case of the fuel cell vulnerable to reverse voltage, the vulnerable operating condition of which is classified as the first operating condition group, additional fuel compensation control configured to increase the amount of hydrogen supplied to the anode of the corresponding fuel cell vulnerable to reverse voltage is executed; and in case of the fuel cell vulnerable to reverse voltage, the vulnerable operating condition of which is classified as the second operating condition group, additional fuel compensation control configured to increase both the amount of hydrogen supplied to the anode and an amount of air supplied to a cathode of the corresponding fuel cell vulnerable to reverse voltage is executed.

7. The method according to claim 2, wherein, during execution of the fuel compensation control in the performing the compensatory operation of the fuel cell system, when the voltage deviations of the fuel cells vulnerable to reverse voltage are reduced to less than a second reference voltage, the fuel compensation control is terminated, and information about cell numbers of the fuel cells vulnerable to reverse voltage and the vulnerable operating conditions corresponding to the fuel cells vulnerable to reverse voltage is stored.

* * * * *